(12) United States Patent
Takimoto et al.

(10) Patent No.: US 11,536,405 B2
(45) Date of Patent: Dec. 27, 2022

(54) CONNECTOR

(71) Applicant: Sumitomo Riko Company Limited, Komaki (JP)

(72) Inventors: Yorihiro Takimoto, Komaki (JP); Yoshiki Kodaka, Komaki (JP); Ryousuke Kanegae, Komaki (JP); Makoto Ito, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 385 days.

(21) Appl. No.: 16/856,278

(22) Filed: Apr. 23, 2020

(65) Prior Publication Data

US 2020/0248851 A1 Aug. 6, 2020

Related U.S. Application Data

(63) Continuation of application No. PCT/JP2019/008132, filed on Mar. 1, 2019.

(30) Foreign Application Priority Data

Mar. 28, 2018 (JP) .............................. JP2018-062099

(51) Int. Cl.
 *F16L 41/00* (2006.01)
 *G01K 13/02* (2021.01)
 *F16L 37/14* (2006.01)

(52) U.S. Cl.
 CPC ........... *F16L 41/008* (2013.01); *F16L 37/144* (2013.01); *G01K 13/02* (2013.01)

(58) Field of Classification Search
 CPC ............................ F16L 41/008; F16L 37/144
 (Continued)

(56) References Cited

U.S. PATENT DOCUMENTS

| 7,503,784 B2 | 3/2009 | Osborne et al. |
| 8,439,404 B2 | 5/2013 | Anton et al. |

(Continued)

FOREIGN PATENT DOCUMENTS

| CN | 101260957 A | 9/2008 |
| JP | S63-11966 Y2 | 4/1988 |

(Continued)

OTHER PUBLICATIONS

Sep. 22, 2020 Chinese Office Action issued in Chinese Patent Application No. 201980001897.0.

(Continued)

*Primary Examiner* — Zachary T Dragicevich
(74) *Attorney, Agent, or Firm* — Oliff PLC

(57) ABSTRACT

A connector includes: a tube body formed in a tubular shape having a first opening and a second opening at both ends thereof, a first opening side of the tube body being connectable to an end of a first pipe, a second opening side of the tube body being connectable to an end of a second pipe, the tube body allowing a fluid to flow therethrough between the first opening and the second opening; a temperature detection element embedded in a tubular part of the tube body and configured to detect a temperature of the fluid flowing through the tube body; and a terminal electrically connected to the temperature detection element and exposed to outside of the tube body.

5 Claims, 4 Drawing Sheets

(58) Field of Classification Search
USPC .......................................................... 285/93
See application file for complete search history.

(56) References Cited

U.S. PATENT DOCUMENTS

| | | | |
|---|---|---|---|
| 8,678,446 | B2 | 3/2014 | Nakamura |
| 8,893,567 | B2* | 11/2014 | Kurth .................... F16L 41/008 |
| 9,010,810 | B2 | 4/2015 | Anton et al. |
| 9,400,070 | B2 | 7/2016 | Anton et al. |
| 2007/0212912 | A1 | 9/2007 | Osborne et al. |
| 2010/0201118 | A1 | 8/2010 | Anton et al. |
| 2011/0148096 | A1* | 6/2011 | Engle ..................... G01K 13/02 |
| | | | 285/93 |
| 2012/0247179 | A1 | 10/2012 | Kerin et al. |
| 2012/0248763 | A1 | 10/2012 | Nakamura |
| 2013/0147184 | A1* | 6/2013 | Lutzke ................. F16L 41/008 |
| 2013/0270814 | A1 | 10/2013 | Anton et al. |
| 2014/0137655 | A1* | 5/2014 | Jensen ................. F16L 41/008 |
| 2015/0252922 | A1 | 9/2015 | Anton et al. |
| 2018/0335172 | A1* | 11/2018 | Hammer ............... F16L 41/008 |

FOREIGN PATENT DOCUMENTS

| | | |
|---|---|---|
| JP | H01-167651 U | 11/1989 |
| JP | H11-211578 A | 8/1999 |
| JP | 2008-215609 A | 9/2008 |
| JP | 2010-532452 A | 10/2010 |
| JP | 2012-220025 A | 11/2012 |
| JP | 5354393 B2 | 11/2013 |
| WO | 2009/003016 A1 | 12/2008 |
| WO | WO-2015161929 A1 * | 10/2015 ............ F16L 41/008 |

OTHER PUBLICATIONS

Dec. 7, 2021 Office Action issued in Japanese Patent Application No. 2018-062099.
May 28, 2019 International Search Report issued in International patent Application No. PCT/JP2019/008132.
May 28, 2109 Written Opinion issued in International Patent Application No. PCT/JP2019/008132.
May 10, 2022 Office Action issued in Japanese Patent Application No. 2018-062099.

* cited by examiner

CONNECTOR

CROSS REFERENCE TO RELATED APPLICATIONS

The present application is a Continuation Application of International Application No. PCT/JP2019/008132, filed on Mar. 1, 2019, which is incorporated herein by reference. The present invention is based on Japanese Patent Application No. 2018-062099, filed on Mar. 28, 2018, the entire contents of which are incorporated herein by reference.

BACKGROUND OF THE INVENTION

1. Field of the Invention

The present invention relates to a connector.

2. Description of the Related Art

JP2008-215609A, JP2012-220025A, and JP5354393B2 disclose structures in which a connector connecting a first pipe and a second pipe is provided with a detection element for detecting the temperature of a fluid flowing in the connector, or the like. The connectors disclosed in JP2008-215609A and JP2012-220025A each include a tube body through which a fluid flows, a detection element storage portion formed so as to protrude outward in the radial direction from the outer surface of the tube body, a detection element stored in the detection element storage portion, and a terminal stored in the detection element storage portion and connected to the detection element.

The connector disclosed in JP 5354393B2 includes a tube body through which a fluid flows, a detection element provided so as to protrude inward in the radial direction from the inner circumferential surface of the tube body, a terminal storage portion formed so as to protrude outward in the radial direction from the outer surface of the tube body, and a terminal stored in the terminal storage portion and connected to the detection element.

SUMMARY OF THE INVENTION

However, in the connectors disclosed in JP2008-215609A and JP2012-220025A, the detection element is stored in the detection element storage portion formed so as to protrude outward in the radial direction from the outer surface of the tube body. Thus, the size of the connector is increased. Further, the shape of a housing (tube body and detection element storage portion) of the connector is complicated, resulting in high cost. In the connector disclosed in JP5354393B2, the detection element protrudes inward in the radial direction from the inner circumferential surface of the tube body. Thus, the detection element may hamper flow of a fluid in the tube body. Further, the detection element is directly subjected to the pressure of the flowing fluid, and therefore the stiffness of a part supporting the detection element needs to be increased. This leads to high cost.

An object of the present invention is to provide a connector that enables cost reduction by simplifying the arrangement structure for a temperature detection element.

A connector according to the present invention includes: a tube body formed in a tubular shape having a first opening and a second opening at both ends thereof, a first opening side of the tube body being connectable to an end of a first pipe, a second opening side of the tube body being connectable to an end of a second pipe, the tube body allowing a fluid to flow therethrough between the first opening and the second opening; a temperature detection element embedded in a tubular part of the tube body and configured to detect a temperature of the fluid flowing through the tube body; and a terminal electrically connected to the temperature detection element and exposed to outside of the tube body.

The temperature detection element is embedded in the tube body. That is, the temperature detection element is located in an area forming the tubular part of the tube body. Thus, the temperature detection element is not located outward in the radial direction from the outer surface of the tube body, and is not located inward in the radial direction from the inner circumferential surface of the tube body. Since the temperature detection element is not located outward in the radial direction from the outer surface of the tube body, the size of the connector is reduced. Further, since the temperature detection element is not located inward in the radial direction from the inner circumferential surface of the tube body, flow of a fluid flowing through the tube body is not hampered. In particular, as compared to the case where the temperature detection element protrudes inward in the radial direction from the inner circumferential surface of the tube body, the stiffness of the part supporting the temperature detection element need not be taken into consideration. Therefore, the structure of the connector is simplified. This leads to cost reduction.

DESCRIPTION OF THE EMBODIMENTS

1. First Embodiment (1-1. Structure of Connector 1)

Figure 1:
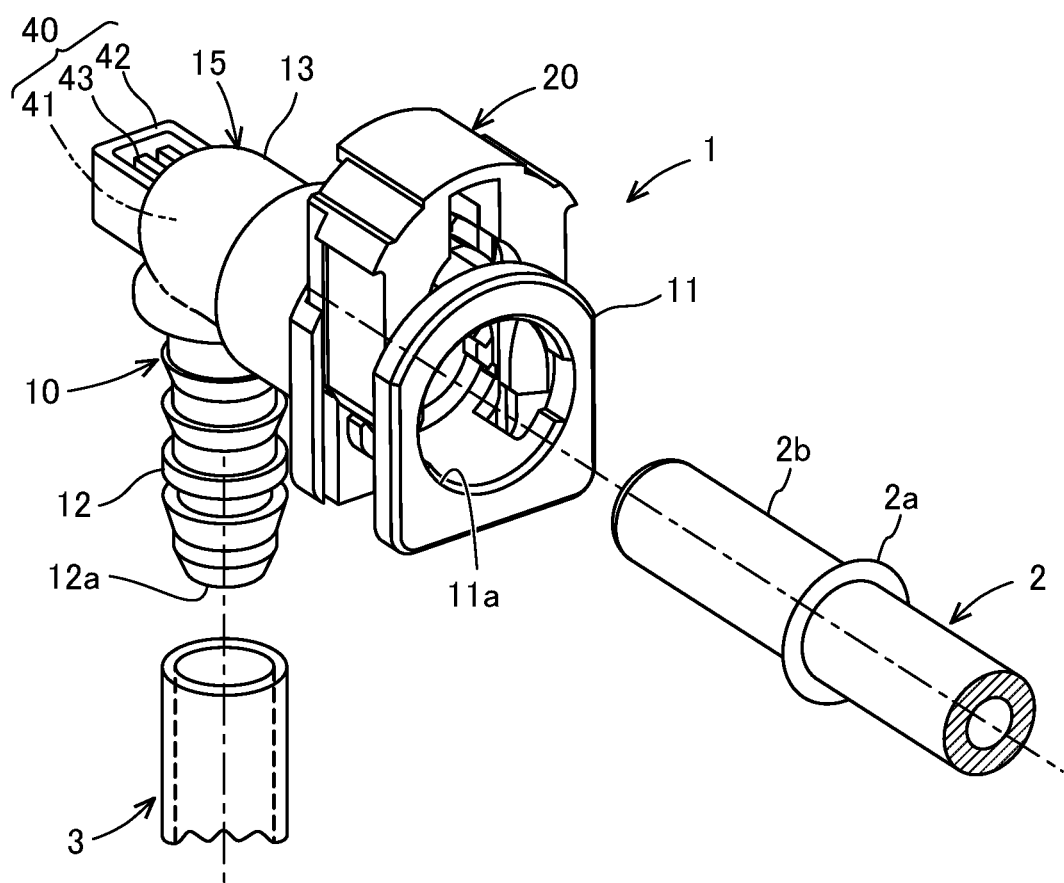
FIG. 1 is a perspective view including a connector according to the first embodiment before a first pipe and a second pipe are connected thereto.
Figure 2:
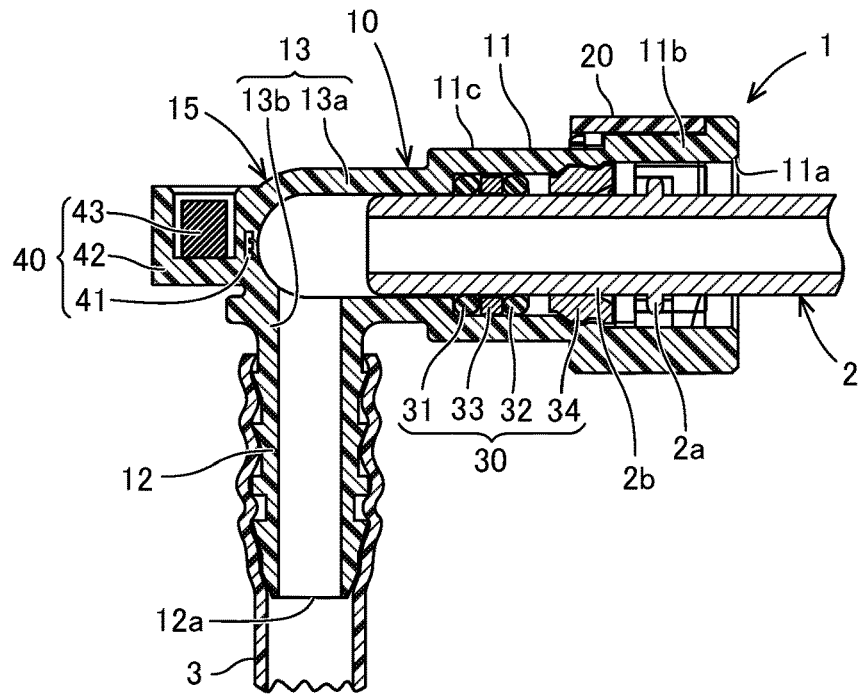
FIG. 2 is a sectional view of the connector taken along a flow path direction in a state in which the first pipe and the second pipe are connected thereto.

The structure of a connector 1 according to the first embodiment will be described with reference to FIG. 1 to FIG. 3. The connector 1 is used for, for example, forming a fuel pipe of an automobile. The connector 1 is also applicable to various pipes other than a fuel pipe. In the present embodiment, the connector 1 forms a flow path through which fuel flows. As shown in FIG. 1 and FIG. 2, an end of a first pipe 2 is inserted to a first end side of the connector 1, and an end of a second pipe 3 is externally fitted to the second end side of the connector 1. Thus, the connector 1 connects the first pipe 2 and the second pipe 3, and allows a fluid to flow between the first pipe 2 and the second pipe 3.

As shown in FIG. 1, the first pipe 2 is, for example, made of metal, and is formed in a tubular shape. The end of the first pipe 2 has an annular flange 2a (also called bead) formed so as to protrude outward in the radial direction at a position distant in the axial direction from the endmost point, and an end portion 2b which is a small-diameter part on the head end side with respect to the annular flange 2a. The second pipe 3 is made of resin and is formed in a thin tubular shape.

The connector 1 includes a tube body 10, a retainer 20, a seal unit 30, and a temperature detection unit 40. The tube body 10 is formed in a tube shape having a first opening 11a and a second opening 12a at both ends. Thus, the tube body 10 allows a fluid (fuel) to flow between the first opening 11a and the second opening 12a. In other words, the tube body 10 is a structure for a fluid to flow between the first opening 11a and the second opening 12a. In the present embodiment, the tube body 10 is formed in a tube shape having a bent portion 15. Specifically, the tube body 10 is bent in an L shape. However, the tube body 10 may be formed in a straight shape without having the bent portion 15. The tube body 10 is integrally molded with resin. Specifically, the tube body 10 is integrally molded by injection molding. The tube body 10 is made of, for example, glass fiber reinforced polyamide.

Figure 3:
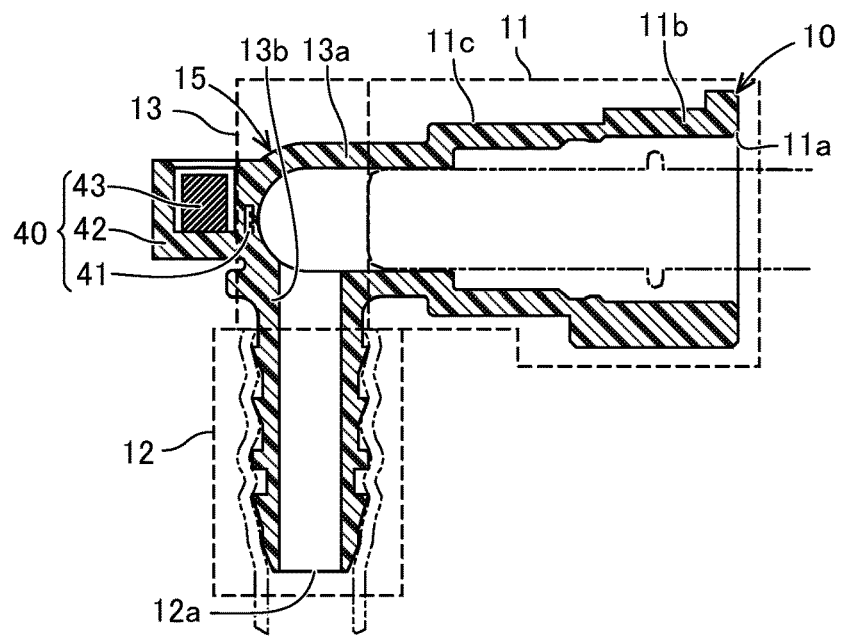
FIG. 3 is a sectional view of a tube body of the connector taken along the flow path direction.

As shown in FIG. 3, the tube body 10 has a first tube portion 11, a second tube portion 12, and a third tube portion 13 when divided in the flow path direction. In the flow path direction, the first tube portion 11 and the third tube portion 13 are contiguous to each other, and the third tube portion 13 and the second tube portion 12 are contiguous to each other. That is, in the flow path direction, the third tube portion 13 is located between the first tube portion 11 and the second tube portion 12.

The first tube portion 11 is a part having the first opening 11a and is formed in a straight tubular shape. The first opening 11a is an opening into which the end portion 2b and the annular flange 2a at the end of the first pipe 2 are inserted. As shown in FIG. 2 and FIG. 3, the first tube portion 11 corresponds to an area that overlaps the first pipe 2 in the flow path direction in a state in which the end of the first pipe 2 is inserted from the first opening 11a. That is, the inner circumferential surface of the first tube portion 11 is opposed to the outer circumferential surface of the first pipe 2, in the radial direction, over the entire length.

The first tube portion 11 includes a retainer placement portion 11b on the first opening 11a side. The retainer placement portion 11b has a hole penetrating in the radial direction and is a part at which the retainer 20 is placed. The retainer placement portion 11b is configured to be engaged with the retainer 20 in the radial direction. The first tube portion 11 includes a seal portion 11c on a side of the retainer placement portion 11b opposite to the first opening 11a. The seal portion 11c is formed in a cylindrical shape. The seal unit 30 is provided on the inner circumferential side of the seal portion 11c.

The second tube portion 12 is a part having the second opening 12a and is formed in a straight tubular shape. The second opening 12a is an opening on the side where the end of the second pipe 3 is externally fitted. As shown in FIG. 2 and FIG. 3, the second tube portion 12 corresponds to an area that overlaps the second pipe 3 in the flow path direction in a state in which the end of the second pipe 3 is fitted to the outer circumference of the second tube portion 12 on the second opening 12a side. That is, the outer circumferential surface of the second tube portion 12 is opposed to the inner circumferential surface of the second pipe 3, in the radial direction, over the entire length.

The inner circumferential surface of the second tube portion is formed in a cylindrical shape. Further, the inner circumferential surface of the second tube portion 12 forms a surface with which a fluid comes into direct contact. That is, the inner circumferential surface of the second tube portion 12 has no such member that protrudes inward in the radial direction, and therefore does not hamper flow of a fluid. The diameter of the inner circumferential surface of the second tube portion 12 is smaller than the diameter of the inner circumferential surface of the first tube portion 11. The diameter of the inner circumferential surface of the second tube portion 12 is equal to the inner diameter of the first pipe 2.

On the other hand, the outer circumferential surface of the second tube portion 12 is formed in a recessed and projecting shape in a cross section taken along the flow path direction so that the second pipe 3 externally fitted thereto does not come off. Here, the second tube portion 12 is formed of a material that is less deformable than the second pipe 3. Therefore, in a state in which the second pipe 3 is externally fitted to the second tube portion 12, the second tube portion 12 is hardly deformed while the diameter of the second pipe 3 is expanded. That is, the second pipe 3 is deformed along the recesses and projections on the outer circumferential surface of the second tube portion 12.

The third tube portion 13 connects a side of the first tube portion 11 opposite to the first opening 11a, and a side of the second tube portion 12 opposite to the second opening 12a, in the flow path direction. The third tube portion 13 is a part having the bent portion 15 described above. The third tube portion 13 corresponds to an area in which neither the first pipe 2 nor the second pipe 3 is present. Thus, the inner circumferential surface of the third tube portion 13 forms a surface with which a fluid comes into direct contact. That is, the inner circumferential surface of the third tube portion 13 has no such member that protrudes inward in the radial direction, and therefore does not hamper flow of a fluid. The outer surface of the third tube portion 13 is not covered by a pipe other than the connector 1.

The third tube portion 13 includes a large-diameter tube portion 13a and a small-diameter tube portion 13b. The large-diameter tube portion 13a is connected coaxially to the first tube portion 11. Thus, the large-diameter tube portion 13a is located on the first opening 11a side in the third tube portion 13. The diameter of the inner circumferential surface of the large-diameter tube portion 13a is equal to the diameter of the inner circumferential surface of a part into which the endmost part (part having an opening in the end portion 2b) of the first pipe 2 is inserted, in the first tube portion 11. Thus, the large-diameter tube portion 13a forms a large-diameter flow path in the third tube portion 13.

The small-diameter tube portion 13b is connected coaxially to the second tube portion 12. Thus, the small-diameter tube portion 13b is located on the second opening 12a side in the third tube portion 13. The diameter of the inner circumferential surface of the small-diameter tube portion 13b is equal to the diameter of the inner circumferential surface of the second tube portion 12. Thus, the small-diameter tube portion 13b forms a small-diameter flow path in the third tube portion 13.

The radial-direction thickness of the large-diameter tube portion 13a is greater than the radial-direction thickness of the small-diameter tube portion 13b. In the present embodiment, the large-diameter tube portion 13a and the small-diameter tube portion 13b are connected to each other with some angle therebetween. Specifically, an end of the small-diameter tube portion 13b is connected to a side surface of the large-diameter tube portion 13a.

The retainer 20 is made of, for example, glass fiber reinforced polyamide. The retainer 20 is retained at the retainer placement portion 11b of the tube body 10. The retainer 20 is movable in the radial direction of the retainer placement portion 11b by operator's push-in operation and pull-out operation. When the first pipe 2 is inserted to a regular position in the first tube portion 11, the retainer 20 becomes movable from an initial position shown in FIG. 1 to a confirmation position shown in FIG. 2. Therefore, when the retainer 20 is allowed to be pushed-in, the operator confirms that the first pipe 2 has been inserted to the regular position in the first tube portion 11.

In a state in which the retainer 20 is pushed-in to the confirmation position, the retainer 20 is engaged with the annular flange 2a of the first pipe 2 in the pipe pull-out direction so that the retainer 20 prevents the first pipe 2 from being pulled out. That is, by performing push-in operation of the retainer 20, the operator confirms that the first pipe 2 has been inserted to the regular position in the first tube portion 11 and the first pipe 2 is prevented by the retainer 20 from being pulled out.

The seal unit 30 includes annular seal members 31, 32 made of fluororubber or the like, a collar 33 made of resin and sandwiched in the axial direction between the annular seal members 31, 32, and a bush 34 made of resin and positioning the annular seal members 31, 32 and the collar 33 in the seal portion 11c of the first tube portion 11. As shown in FIG. 2, on the inner circumferential side of the seal unit 30, the end portion 2b of the first pipe 2 is inserted, and the annular flange 2a of the first pipe 2 is located on the first opening 11a side with respect to the seal unit 30.

The temperature detection unit 40 is a unit for detecting the temperature of a fluid flowing through the tube body 10. As shown in FIG. 2, the temperature detection unit 40 includes a temperature detection element 41, a terminal storage portion 42, and a terminal 43.

The temperature detection element 41 is, for example, a thermistor. The temperature detection element 41 is embedded in a tubular part of the tube body 10, and detects the temperature of a fluid flowing through the tube body 10. In particular, the temperature detection element 41 is desirably embedded in, of the tube body 10, the remaining part excluding the first tube portion 11, i.e., an area of the second tube portion 12 or the third tube portion 13. At the first tube portion 11, the first pipe 2 is present on the inner circumferential side thereof. Therefore, if the temperature detection element 41 is embedded in the first tube portion 11, the temperature detection element 41 may be influenced by the presence of the first pipe 2. Therefore, the temperature detection element 41 is desirably embedded in an area other than the first tube portion 11, i.e., an area of the second tube portion 12 or the third tube portion 13.

In particular, in the present embodiment, as shown in FIG. 2, the temperature detection element 41 is embedded in an area of the third tube portion 13 excluding the first tube portion 11 and the second tube portion 12. The second pipe 3 is externally fitted to the second tube portion 12. Therefore, routing of an electric wire connected to the temperature detection element 41 is not easy. Accordingly, an area where neither the first pipe 2 nor the second pipe 3 is present, i.e., the area of the third tube portion 13, is preferable.

More specifically, the temperature detection element 41 is embedded at a boundary part between the large-diameter tube portion 13a and the small-diameter tube portion 13b, in the third tube portion 13. In other words, the temperature detection element 41 is embedded on a side far from the first tube portion 11, in the large-diameter tube portion 13a, or on side far from the second tube portion 12, in the small-diameter tube portion 13b. Here, change in the flow rate of a fluid may influence the detection temperature of the fluid at the inner circumferential surface of the third tube portion 13. However, at the boundary part between the large-diameter tube portion 13a and the small-diameter tube portion 13b, the flow speed of the fluid greatly changes. Therefore, even if the flow rate of the flowing fluid has changed, change in the flow speed of the fluid suppresses the influence on the detection temperature of the fluid at the inner circumferential surface of the third tube portion 13. That is, embedding the temperature detection element 41 at the boundary part enables accurate detection for the fluid temperature.

In particular, in the present embodiment, the third tube portion 13 has the bent portion 15. That is, the temperature detection element 41 is embedded in the bent portion 15. The bent portion 15 is an area where the flow speed of a fluid greatly changes. Also by this, even if the flow rate of the flowing fluid has changed, change in the flow speed of the fluid suppresses the influence on the detection temperature of the fluid at the inner circumferential surface of the third tube portion 13 having the bent portion 15. That is, embedding the temperature detection element 41 at the boundary part enables accurate detection for the fluid temperature.

Furthermore, the temperature detection element 41 is embedded on the large-diameter tube portion 13a side in the boundary part between the large-diameter tube portion 13a and the small-diameter tube portion 13b in the third tube portion 13. The radial-direction thickness of the large-diameter tube portion 13a is greater than the radial-direction thickness of the small-diameter tube portion 13b. Therefore, if the temperature detection element 41 is embedded in the large-diameter tube portion 13a, the retention force of the temperature detection element 41 is enhanced and a sufficient strength of the connector 1 is ensured in spite of the embedding of the temperature detection element 41.

The terminal storage portion 42 is integrally molded on the tubular outer surface of the tube body 10, and is provided so as to protrude outward from the tubular outer surface of the tube body 10. The terminal storage portion 42 is formed of the same type of material as the tube body 10, and is molded by injection molding at the same time as molding of the tube body 10. The outer shape of the terminal storage portion 42 is, for example, a rectangular parallelepiped. However, the outer shape of the terminal storage portion 42 is not limited to a rectangular parallelepiped, but may be any shape.

The terminal storage portion 42 is provided on the tubular outer surface of the third tube portion 13 of the tube body 10, and is located near the temperature detection element 41. More specifically, the terminal storage portion 42 is provided on the tubular outer surface of the large-diameter tube portion 13a of the third tube portion 13. That is, the terminal storage portion 42 is provided at the same position as the temperature detection element 41 in the flow path direction between the first opening 11a and the second opening 12a. The thickness of the terminal storage portion 42 is equal to the thickness of the large-diameter tube portion 13a of the third tube portion 13. In the present embodiment, the terminal storage portion 42 is provided so as to protrude outward from the bottom-side outer surface of the large-diameter tube portion 13*a* of the third tube portion 13.

The terminal 43 is stored in the terminal storage portion 42. The terminal 43 is electrically connected to the temperature detection element 41. That is, the terminal 43 and the temperature detection element 41 are connected to each other via an electric wire (not shown). The electric wire is embedded in the tube body 10 and the terminal storage portion 42. That is, the electric wire is embedded when the tube body 10 and the terminal storage portion 42 are molded by injection molding. Further, the terminal 43 is exposed on the outer side of the tube body 10. More specifically, the terminal 43 is exposed to the outside, in the terminal storage portion 42. The terminal 43 is formed in such a shape as to be electrically connectable to a terminal of an electric connector that is a counterpart member. The direction in which the terminal 43 is exposed to the outside of the terminal storage portion 42 is not limited to the direction shown in FIG. 2, but may be any direction.

(1-2. Details of Arrangement of Temperature Detection Element 41)

The temperature detection element 41 is embedded in the third tube portion 13 of the tube body 10 as described above. Modes thereof include a mode in a first example shown in FIG. 4 and a mode in a second example shown in FIG. 5.

Figure 4:
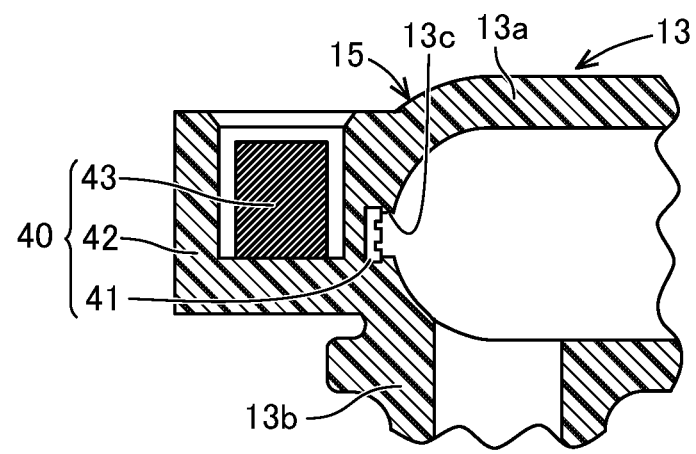
FIG. 4 is an enlarged view around a temperature detection element in a first example.

In the mode in the first example shown in FIG. 4, the temperature detection element 41 is provided so as to be exposed on the inner circumferential surface of the third tube portion 13 of the tube body 10, and is exposed at a hole 13*c* branching from a main flow path connecting the first opening 11*a* and the second opening 12*a*. The temperature detection element 41 and the hole 13*c* are arranged in the thickness direction of the third tube portion 13, and thus the length of the hole 13*c* is shorter than the thickness of the third tube portion 13. In addition, the size of the hole 13*c* is smaller than the size of the flow path in the third tube portion 13. The temperature detection element 41 is allowed to be in direct contact with a fluid, whereby the fluid temperature is detected accurately.

Figure 5:
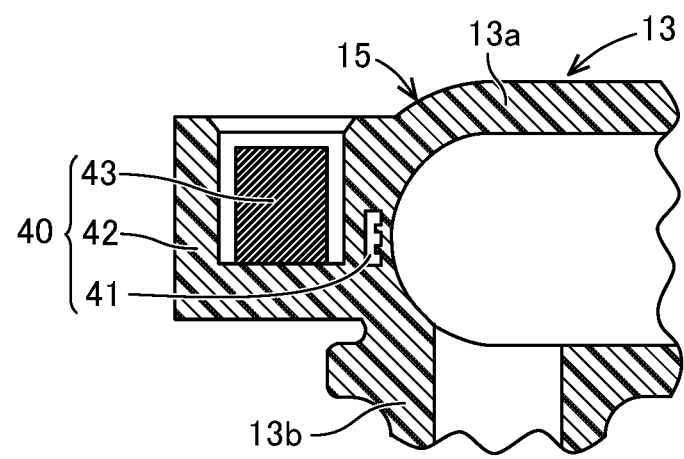
FIG. 5 is an enlarged view around a temperature detection element in a second example.

In the mode in the second example shown in FIG. 5, the temperature detection element 41 is covered by the material forming the inner circumferential surface of the third tube portion 13 of the tube body 10, and thus is not exposed to the inner circumferential side of the tube body 10. That is, in the thickness direction of the third tube portion 13, the temperature detection element 41 is located on the outer side with respect to the inner circumferential surface that comes into contact with a fluid. Furthermore, in the thickness direction of the third tube portion 13, the temperature detection element 41 is located on the inner side with respect to the outer surface of the tubular part.

(1-3. Effects)

As described above, the temperature detection element 41 is embedded in the tube body 10. That is, the temperature detection element 41 is located in an area forming the tubular part of the tube body 10. Thus, the temperature detection element 41 is not located outward in the radial direction from the outer surface of the tube body 10, and is not located inward in the radial direction from the inner circumferential surface of the tube body 10. Since the temperature detection element 41 is not located outward in the radial direction from the outer surface of the tube body 10, the size of the connector 1 is reduced. Further, since the temperature detection element 41 is not located inward in the radial direction from the inner circumferential surface of the tube body 10, flow of a fluid flowing through the tube body 10 is not hampered. In particular, as compared to the case where the temperature detection element 41 protrudes inward in the radial direction from the inner circumferential surface of the tube body 10, the stiffness of the part supporting the temperature detection element 41 need not be taken into consideration. Therefore, the structure of the connector 1 is simplified. This leads to cost reduction.

2. Second Embodiment

Figure 6:
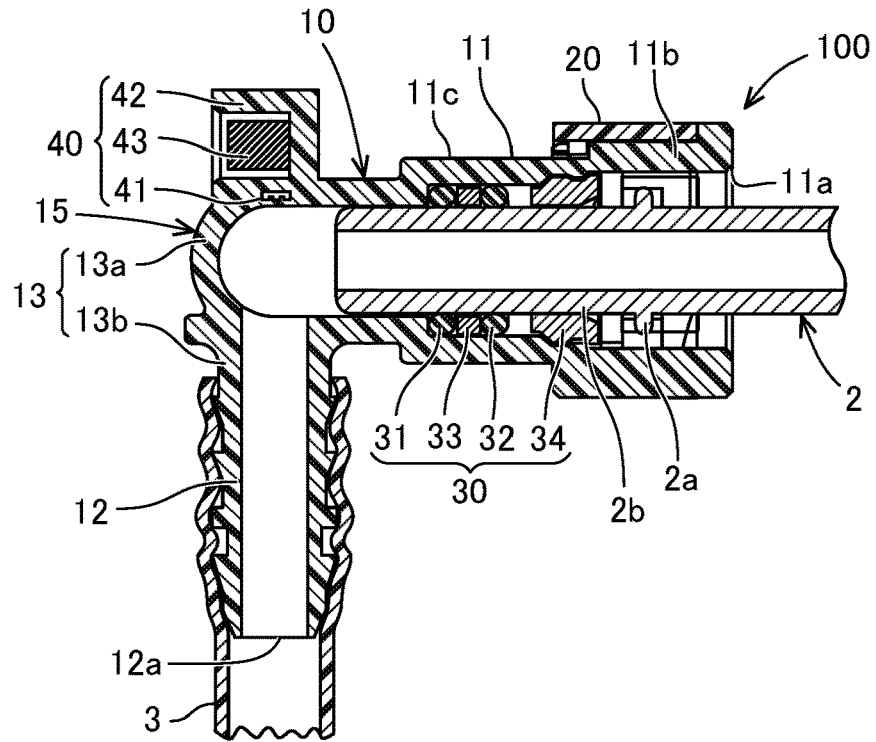
FIG. 6 is a sectional view including a connector according to the second embodiment, taken along the flow path direction in a state in which the first pipe and the second pipe are connected thereto.

A connector 100 according to the second embodiment will be described with reference to FIG. 6. As shown in FIG. 6, the terminal storage portion 42 is provided on the tubular outer surface of the third tube portion 13 of the tube body 10 and is located near the temperature detection element 41, as in the first embodiment. More specifically, the terminal storage portion 42 is provided on the tubular outer surface of the large-diameter tube portion 13*a* of the third tube portion 13. That is, the terminal storage portion 42 is provided at the same position as the temperature detection element 41 in the flow path direction between the first opening 11*a* and the second opening 12*a*. However, in the second embodiment, the terminal storage portion 42 is provided so as to protrude outward from the circumferential-side outer surface of the large-diameter tube portion 13*a* of the third tube portion 13. This structure also provides the same effects as in the connector 1 of the first embodiment.

3. Third Embodiment

Figure 7:
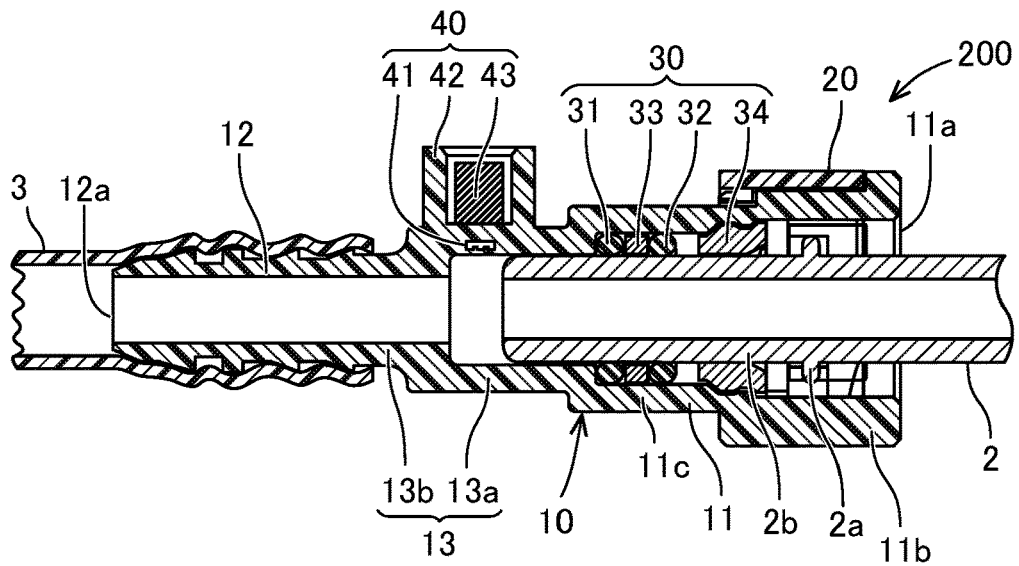
FIG. 7 is a sectional view including a connector according to the third embodiment, taken along the flow path direction in a state in which the first pipe and the second pipe are connected thereto.

A connector 200 according to the third embodiment will be described with reference to FIG. 7. As shown in FIG. 7, the connector 200 is formed in a straight shape. That is, the third tube portion 13 is formed in a straight shape. The large-diameter tube portion 13*a* and the small-diameter tube portion 13*b* of the third tube portion 13 are formed coaxially with each other. However, the large-diameter tube portion 13*a* and the small-diameter tube portion 13*b* may be formed non-coaxially with each other and in parallel to each other. Also in the present embodiment, the temperature detection element 41 is embedded in the large-diameter tube portion 13*a* of the third tube portion 13, and the terminal storage portion 42 is also molded integrally with the large-diameter tube portion 13*a* in the same manner. This structure also provides the same effects as in the connector 1 of the first embodiment, except for the effects obtained by the structure having the bent portion 15.

What is claimed is:

1. A connector comprising:
   a tube body formed in a tubular shape having a first opening and a second opening at both ends thereof, a first opening side of the tube body being connectable to an end of a first pipe, a second opening side of the tube body being connectable to an end of a second pipe, the tube body allowing a fluid to flow therethrough between the first opening and the second opening;
   a temperature detection element embedded in a tubular part of the tube body and configured to detect a temperature of the fluid flowing through the tube body; and
   a terminal electrically connected to the temperature detection element and exposed to outside of the tube body, wherein:
   the tube body includes:
      a first tube portion corresponding to an area that overlaps the first pipe in a flow path direction in a state in which the first pipe is inserted from the first opening;

a second tube portion corresponding to an area that overlaps the second pipe in the flow path direction in a state in which the second pipe is fitted to an outer circumference of the second tube portion on the second opening side; and a third tube portion connecting the first tube portion and the second tube portion in the flow path direction, the third tube portion includes:

a large-diameter tube portion located on the first opening side, connecting to the first tube portion, and forming a large-diameter flow path; and a small-diameter tube portion located on the second opening side, connecting to the second tube portion, and forming a small-diameter flow path, a wall thickness of the large-diameter tube portion is greater than a wall thickness of the small-diameter tube portion on the second tube portion side, and the temperature detection element is embedded at a part on a large-diameter tube portion side in a boundary part between the large-diameter tube portion and the small-diameter tube portion, and having a wall thickness greater than that of the small-diameter tube portion on the second tube portion side in an area of the third tube portion excluding the first tube portion and the second tube portion.

2. The connector according to claim 1, further comprising a terminal storage portion integrally molded on a tubular outer surface of the tube body and protruding outward from the tubular outer surface of the tube body, the terminal storage portion being provided at the same position as a position of the temperature detection element in a flow path direction between the first opening and the second opening, wherein the terminal is stored in the terminal storage portion.

3. The connector according to claim 2, wherein the tube body is formed in a tubular shape having a bent portion, the temperature detection element is embedded in the bent portion, and the terminal storage portion is integrally molded on an outer surface of the bent portion.

4. The connector according to claim 1, wherein the temperature detection element is provided so as to be exposed on an inner circumferential surface of the tube body, and is exposed at a hole branching from a main flow path connecting the first opening and the second opening.

5. The connector according to claim 1, wherein the temperature detection element is covered by a material forming an inner circumferential surface of the tube body and is not exposed to an inner circumferential side of the tube body.

\* \* \* \* \*